United States Patent [19]

Hughes

[11] 4,136,598
[45] Jan. 30, 1979

[54] SNAP-ON CAP AND WASHER ASSEMBLY

[76] Inventor: Rodney R. Hughes, Hebard Hill Rd., Randolph, Vt. 05060

[21] Appl. No.: 826,096

[22] Filed: Aug. 19, 1977

[51] Int. Cl.² .................. A47G 3/00; F16B 15/02
[52] U.S. Cl. ........................... 85/53; 85/55; 85/DIG. 2
[58] Field of Search .......... 85/53, 54, 55, 56, DIG. 2, 85/52, 50 R, DIG. 3; 24/113 MP, 107; 151/70; 215/353

[56] References Cited

U.S. PATENT DOCUMENTS

| 2,654,927 | 10/1953 | Tansman | 24/107 X |
| 3,979,802 | 9/1976 | Bongartz et al. | 24/107 X |

FOREIGN PATENT DOCUMENTS

| 1281713 | 12/1961 | France | 85/55 |
| 618169 | 2/1961 | Italy | 85/55 |
| 916162 | 1/1963 | United Kingdom | 85/53 |
| 925314 | 5/1963 | United Kingdom | 85/55 |

Primary Examiner—James T. McCall
Attorney, Agent, or Firm—Sughrue, Rothwell, Mion, Zinn and Macpeak

[57] ABSTRACT

A snap-on cap and washer assembly for screw and like fasteners which attach paneling and similar interiors to walls or framework is disclosed. The snap-on cap has a centrally located cylindrical hub equipped with a radially outwardly extending annular flange, and the washer is adapted to fixedly receive the cylindrical hub of the cap piece.

2 Claims, 4 Drawing Figures

SNAP-ON CAP AND WASHER ASSEMBLY

BACKGROUND OF THE INVENTION

1. Field of the Invention

The present invention relates to a snap-on cap and washer assembly for screws and the like employed to attach paneling or similar interior finishing. When assembled, the snap-on cap hides the unattractive screw head and provides a decorative and protective cover for the fastening element. The assembly may be used in a variety of environments, however, it is especially suited for attaching paneling and similar materials to the framework of a van-type truck interior.

2. Description of the Prior Art

A search of the prior art developed the following U.S. patents: U.S. Pat. Nos. 336,062, 336,063, 3,300,929, 3,485,134, 3,881,391 and 3,930,432. Also developed were British Pat. Nos. 832,019 and 1,116,444; Italian Pat. No. 618,169, issued Feb. 25, 1961; and French Pat. No. 1,380,160, issued Oct. 19, 1964.

The patents developed in the search have one feature in common. In all of these prior art patents, the peripheral portion of the cap is extended downwardly to form a cylindrical skirt which is equipped with an inwardly directed annular flange which snaps down on an outwardly directed annular flange in the base member. This is best illustrated by U.S. Pat. No. 3,930,432 to Puchy.

SUMMARY OF THE INVENTION

The instant snap-on cap and washer assembly has a unique construction. The cap is not equipped with an inwardly directed annular flange formed on a circumferential skirt extending from the cap body. Rather, in accordance with the present invention, the cap is equipped with a centrally located cylindrical hub equipped with an outwardly directed annular flange. The cap fits on a washer adapted to fixedly receive the cylindrical hub with an inwardly directed annular flange. In accordance with this unique construction, the skirt portions of the cap are independent of the cap attaching means (the cylindrical hub). In this way, the outer skirt portions of the cap are not flexed during assembly. Consequently, the skirt is free to fulfill its decorative role without the encumbrances of forming a snap-fit connection. The skirt can be decoratively designed or be made to sit flushly against the installed paneling, thereby fulfilling both a decorative and protective function.

It is an object of the present invention to provide a snap-on cap and washer assembly which forms a decorative and protective cover for fasteners employed in mounting paneling and similar structures to a wall or framework.

It is another object of the present invention to provide a snap-on cap assembly for use in customizing van-type trucks.

Another object of the present invention is to provide an assembly having a unique construction wherein the outer walls of the decorative cap are not part of the attachment of the cap to the washer.

Still another object of the invention is to provide a snap-on cap assembly where the skirt is available for decoration or can be made to sit flush against the work piece.

These and other objects of the present invention are accomplished with a cap having a centrally located cylindrical hub equipped with an outwardly directed annular flange and a washer adapted to fixedly receive the hub with an inwardly directed annular flange.

DESCRIPTION OF THE INVENTION

Figure 1:
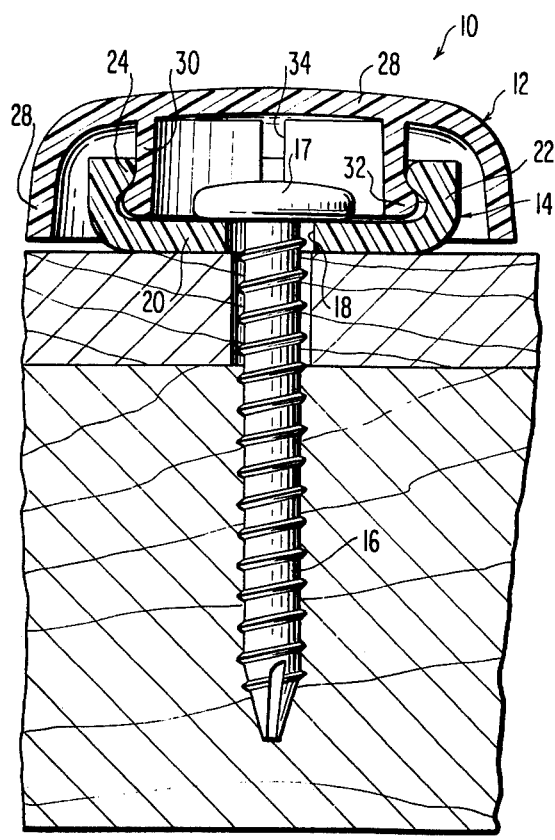
FIG. 1 is a sectional view of the assembly.

The present invention will become more clear by reference to the accompanying drawings where, in FIG. 1, the assembly is indicated generally by reference numeral 10. Assembly 10 comprises snap-on cap 12 and base member 14 which may be formed of an injection molded plastic such as polypropylene. Base member 14 is located against the work surface and a fastening element 16, which may be a typical securing screw of the type employed to secure paneling to framework, is driven through a centrally located aperture 18 into the work material.

Figure 3:
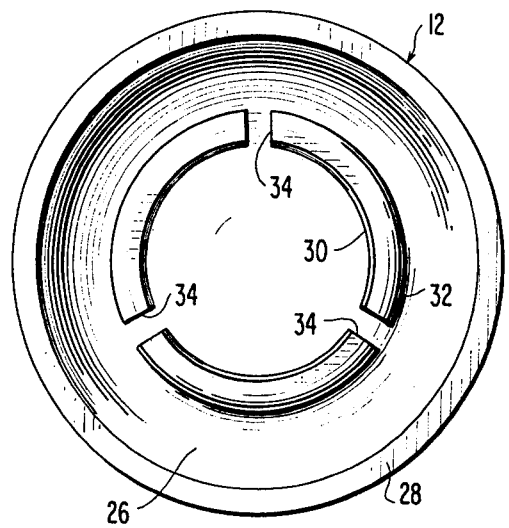
FIG. 3 is an end view of the snap-on cap.
Figure 2:
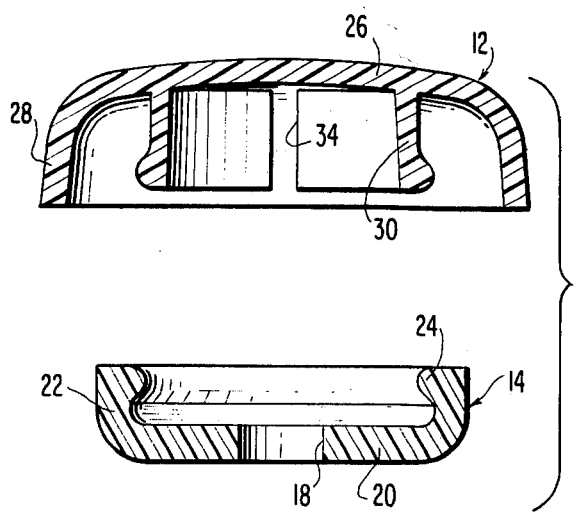
FIG. 2 is an exploded view in section of the snap-on cap and base member.
Figure 4:
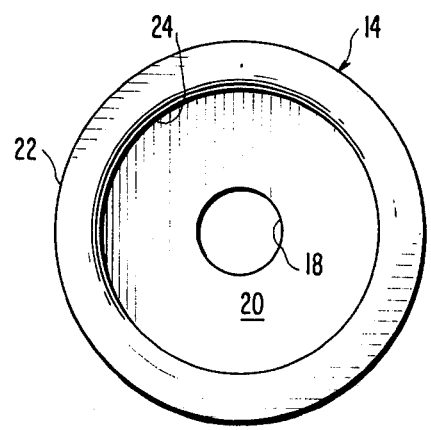
FIG. 4 is an end view of the base member.

Base member 14 is comprised of a preferably flat bottom portion 20 and a resilient cylindrical side wall 22 having an inwardly extending annular flange 24. Snap-on cap 12 comprises a body member 26, a cylindrical skirt 28 and a resilient cylindrical hub 30 having an outwardly extending annular flange 32 thereon. Hub 30 is divided into sections by cuts 34 which contribute to the overall resiliency of the assembly as shown in FIG. 3.

In accordance with this invention, skirt 28 is maintained independent of the attachment hub and, consequently, can be decorated as desired or extended downward so that it is flush with the work piece.

The snap-on cap 12 is mounted over the fastener head 17 by a snapping action wherein the outwardly extending annular flange 32 of the hub 30 and the inwardly extending annular flange 24 of side wall 22 contact and force one another to flex slightly unit flange 32 slides past the innermost portions of flange 24 and hub 30 is drawn into and fixedly received in base member 14.

While one embodiment of this invention has been described in detail, it should be apparent to those of ordinary skill in this art that numerous variations and adaptations are possible without departing from the meaning and scope of the following claims.

I claim:

1. A snap-on and washer assembly for a screw or like fastener which comprises a cap piece having a circumferential skirt and a centrally located cylindrical hub equipped with an outwardly extending annular flange said hub being divided into sections by radial cuts, and a washer having a circumferentially located cylindrical wall equipped with an inwardly extending annular flange adapted to draw the hub inside the wall after the outwardly extending flange of said cap piece passes the innermost extent of said inwardly directed flange and to fixedly receive the cylindrical hub of said cap piece in a snap-fit connection.

2. The assembly of claim 1 wherein said hub is divided into three sections by three radial cuts located at 120° intervals on said hub.

* * * * *